US007114537B2

(12) United States Patent
Paakkunainen et al.

(10) Patent No.: US 7,114,537 B2
(45) Date of Patent: Oct. 3, 2006

(54) TRANSFORMER UNIT

(75) Inventors: Marko Paakkunainen, Tampere (FI); Mauri Marttila, Valkkinen (FI)

(73) Assignee: Plustech Oy, Tampere (FI)

( * ) Notice: Subject to any disclaimer, the term of this patent is extended or adjusted under 35 U.S.C. 154(b) by 363 days.

(21) Appl. No.: 10/332,289

(22) PCT Filed: Jul. 6, 2001

(86) PCT No.: PCT/FI01/00646

§ 371 (c)(1),
(2), (4) Date: Feb. 20, 2003

(87) PCT Pub. No.: WO02/03779

PCT Pub. Date: Jan. 17, 2002

(65) Prior Publication Data

US 2003/0154839 A1 Aug. 21, 2003

(30) Foreign Application Priority Data

Jul. 7, 2000 (FI) .................................. 20001619

(51) Int. Cl.
*A01G 23/08* (2006.01)

(52) U.S. Cl. ....................... 144/4.1; 144/34.1; 418/133

(58) Field of Classification Search ................. 144/4.1, 144/34.1; 83/795, 796, 800; 418/133, 134, 418/159
See application file for complete search history.

(56) References Cited

U.S. PATENT DOCUMENTS

| | | | | |
|---|---|---|---|---|
| 3,196,934 | A | 7/1965 | Sneen et al. | 160/229 |
| 3,244,111 | A * | 4/1966 | Shelhart | 418/133 |
| 3,356,113 | A | 12/1967 | Perugia | |
| 3,565,372 | A | 2/1971 | Jones | |
| 4,989,652 | A | 2/1991 | Hansson | 144/34 |
| 5,201,350 | A | 4/1993 | Milbourn | 144/2 |
| 5,290,155 | A * | 3/1994 | Snow et al. | 418/82 |
| 5,390,715 | A | 2/1995 | Luscombe | 144/2 |
| 5,802,946 | A * | 9/1998 | Leini | 83/794 |
| 5,908,060 | A | 6/1999 | Fargeot | 144/4.1 |
| 6,041,683 | A | 3/2000 | Timperi et al. | 83/76 |
| 6,158,322 | A * | 12/2000 | Ornberg | 83/796 |

FOREIGN PATENT DOCUMENTS

| | | |
|---|---|---|
| DE | 3146695 | 7/1983 |
| SE | 457436 | 12/1988 |
| SU | 736911 A | 5/1980 |
| WO | WO 98/53666 | 12/1998 |

* cited by examiner

*Primary Examiner*—Bena Miller
(74) *Attorney, Agent, or Firm*—Quarles & Brady LLP

(57) ABSTRACT

A transformer unit for sawing, wherein the transformer unit comprises: a first machine element for performing a continuous rotational motion, and a second machine element for performing a limited alternating rotational motion, wherein the transformer unit can be coupled to an arrangement supplying driving energy for the transformer unit, wherein the first and the second machine elements are coupled to a chain saw with a guide bar, wherein the first machine element is for rotating the chain saw, wherein the second machine element is for feeding the guide bar and for returning the guide bar to the starting point of the sawing after the sawing. The second machine element is a wing torsion device operated by pressurized medium, comprising an annular space for the pressurized medium.

20 Claims, 3 Drawing Sheets

TRANSFORMER UNIT

FIELD OF THE INVENTION

The invention relates to a transformer unit for sawing.

BACKGROUND OF THE INVENTION

As to the prior art, reference is made to the publication WO 98/53666 disclosing a sawing unit, in which the second machine element performing the second partial work performance consists of the combination of a toothed rack in a cylinder-piston mechanism operated by a pressurized medium, fixed to the cylinder-piston mechanism and arranged to be movable in its longitudinal direction, and a toothed rim fixed at the end of the sawing unit, in connection with the flange of the saw chain and in cooperation with the rack. The sawing unit is functional as such, and it provides an even moment and a steady speed during the sawing performance. However, the sawing unit presented in said publication WO 98/53666 is, primarily due to its overall principle of operation, massive and bulky in its outer dimensions, wherein it is difficult to place, for example, in connection with the harvester head of a forest machine. On the other hand, the construction of the sawing unit is relatively complex, wherein it has a high price.

SUMMARY OF THE INVENTION

The aim of the present invention is to eliminate, particularly by the application intended for sawing work, the problems of prior art sawing units. In other words, the solution of the present invention provides all the advantages of the prior art sawing unit, i.e. an even moment and a constant speed of the saw flange, but the solution is considerably lighter in its weight and smaller in its outer dimensions as well as more reliable for use as a transformer unit, particularly in sawing functions. Furthermore, it makes accessory functions possible without modifying the dimensions.

To achieve these aims, the transformer unit of the invention is primarily characterized in that the second machine element is a wing torsion device operated by a pressurized medium.

In this invention, the wing torsion device refers to a machine element which is operated by a pressurized medium and which comprises an at least partly annular space for the pressurized medium, wherein the outer surface of the inner rim of the annular space for the pressurized medium is provided with at least one protruding radial wing and, in a corresponding manner, at least one inwards directed radial wing is fixed to the inner surface of the outer rim of the annular space for the pressurized medium, wherein either the inner rim or the outer rim is arranged to rotate in relation to the other rim when pressurized medium is supplied between the wings in the space for the pressurized medium.

According to a particularly advantageous embodiment of the transformer unit, the wing torsion device forming the second machine element is at least partly arranged to surround the first machine element, particularly a shaft, preferably so that an annular space for pressurized medium is formed around the first machine element. This solution makes it possible to achieve a very compact transfer unit.

BRIEF DESCRIPTION OF THE DRAWINGS

The following description illustrates the transformer unit according to the invention in more detail, wherein reference is made to the appended drawings which show an advantageous application of the transformer unit according to the invention. In the drawings.

DETAILED DESCRIPTION OF THE INVENTION

Figure 1:
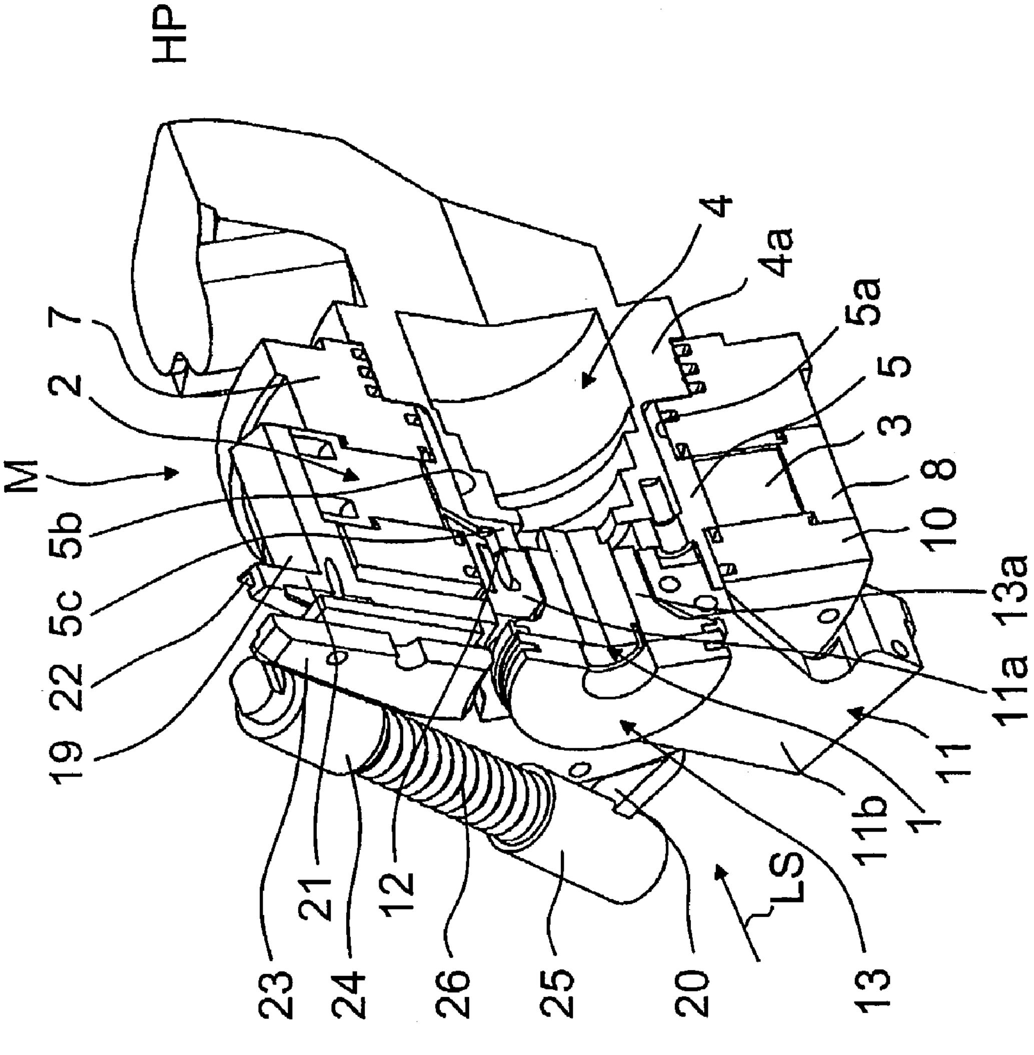
FIG. 1 shows a perspective cross-sectional view of the transformer unit when assembled.
Figure 2:
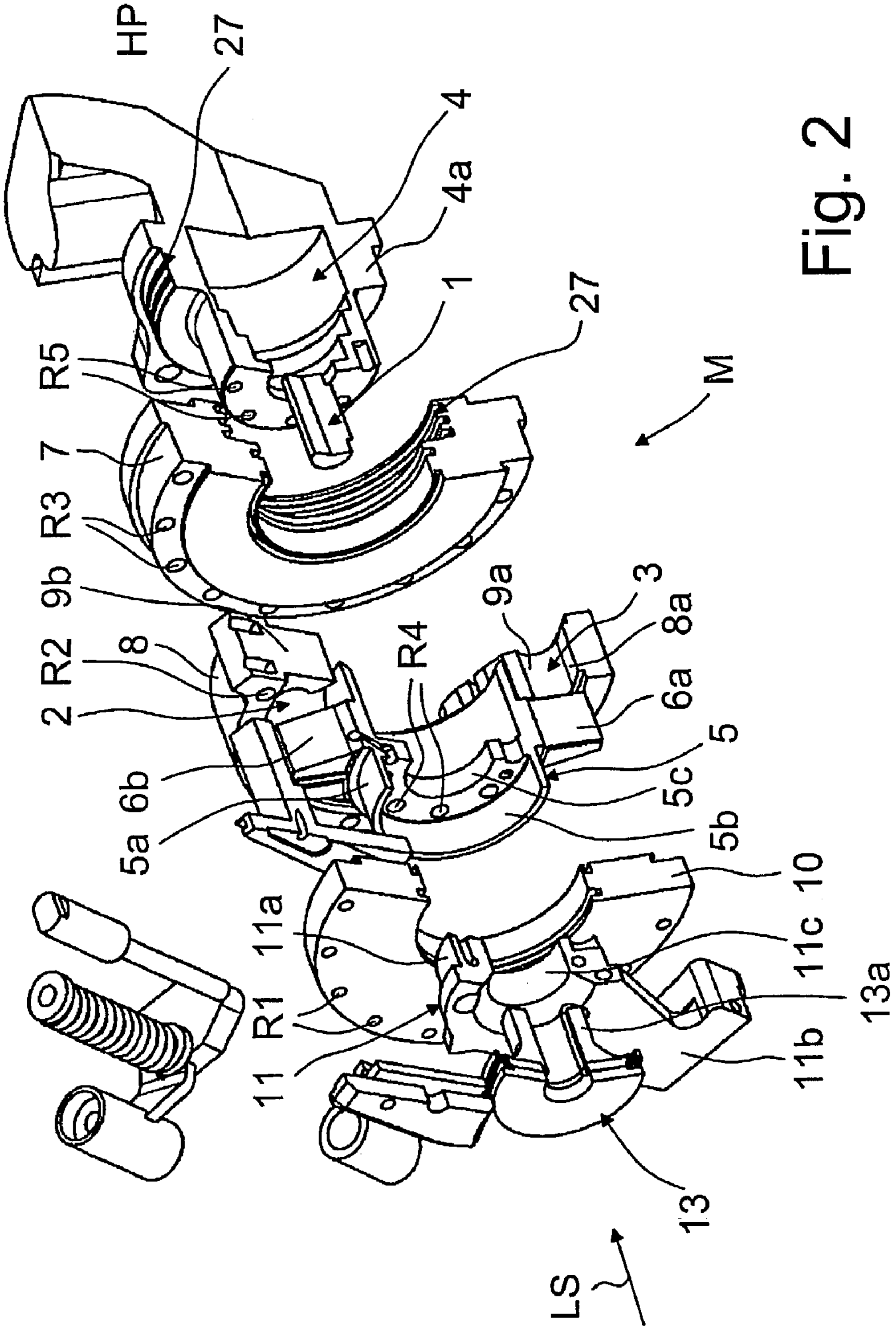
FIG. 2 shows an exploded view of the transformer unit from the direction of FIG. 1, also in a cross-section.

The transformer unit application shown in FIGS. 1 and 2 is intended for use in sawing work to be performed with the harvester head of a forest machine. The detailed structure of the harvester head and the operations to be carried out therewith are disclosed, for example, in several patent publications in the field of forest machinery. The transformer unit M is placed between a flanged chain saw LS (direction of mounting shown) and the frame of the harvester head HP.

The transformer unit M comprises two machine element 1, 2 for performing two partial work performances during the actual sawing performance. Thus, the first machine element 1 is a shaft which is fitted to carry out the first partial work performance, i.e. to rotate the saw chain of the flanged chain saw and to receive its driving energy from a hydraulic engine 4, to which the shaft is coupled. The second machine element 2 is a wing torsion device which is operated by a pressurized medium and is fitted to carry out the second partial work performance, i.e. to feed the flange, or the like, for the saw chain in the sawing direction during the sawing performance and, after the sawing performance, to return the flange of the saw chain to the initial position for sawing. The second machine element 2 is arranged to receive its driving energy from the harvester head. These operations are arranged, in a way known as such, to operate in a controlled manner during the over-all operational sequence of the harvester head.

As can be seen from FIGS. 1 and 2, the wing torsion device forming the second machine element 2 is arranged to surround the first machine element 1, i.e. the shaft, wherein a circular, annular space 3 for pressurized medium is formed around the first machine element 3 to accommodate the wing torsion device used as the second machine element 2. In this case, the inner surface of the annular space 3 for pressurized medium is arranged to be immobilized in relation to the mounting of the transformer unit M, i.e. the frame HP of the harvester head, and the outer surface of the annular space 3 for pressurized medium is, in turn, arranged to rotate in relation to the inner surface during the limited alternating rotation of the second machine element 2.

The hydraulic motor 4 driving the first machine element 1, i.e. the shaft, is arranged to be immobilized in connection with the transformer unit M during its operation, wherein its frame **4*a* forms the mounting for the transformer unit. A sleeve shaft 5 is placed around the first machine element 1, i.e. the shaft, and is fixed to the frame 4*a* of the hydraulic engine 4 in a stationary manner. Furthermore, the outer surface 5*a* of the sleeve shaft 5 (the inner surface of the space 3 for pressurized medium) is provided, in the application of FIGS. 1 and 2, with two integrated wings 6*a*, 6*b* protruding from the outer surface 5*a* in the radial direction and belonging to the wing torsion device forming the second machine element 2. Said wings 6***a*, 6*b* are placed on the outer surface 5*a* of the sleeve shaft 5, at an angular distance of 180° from each other in the direction of the rim of the sleeve shaft 5.

Further with reference to FIGS. 1 and 2, between the frame 4*a* of the hydraulic engine 4 and the wings 6*a*, 6*b* of the sleeve shaft 5, a first end part 7 is placed to limit said annular space 3 for pressurized medium in the first axial direction (mounting direction of the frame of the harvester head HP in FIGS. 1 and 2) and to surround the first end of the sleeve shaft 5 which is fixed to the frame of the hydraulic engine 4. At the wings 6*a*, 6*b* of the sleeve shaft 5, an annular frame part 8 is placed to surround the wings 6*a*, 6*b*. On the inner surface 8*a* of the frame part 8, in the application shown in FIGS. 1 and 2, there are two movable wings 9*a*, 9*b* placed at angular distances of 180° in the direction of the rim of the inner surface and fixed to said inner surface 8*a* to extend in radial direction towards the outer surface 5*a* of the sleeve shaft 5, to which their innermost end is arranged to be sealed in the radial direction. A corresponding arrangement, with respect to the sealing, is also provided between the inner surface 8*a* of the frame part 8 and the ends of the wings 6*a*, 6*b*. Furthermore, in connection with the second end of the sleeve shaft 5, there is a second end part 10 limiting the annular space 3 for pressurized medium in the second axial direction (mounting direction of the flanged chain saw LS in FIGS. 1 and 2) and surrounding the second end of the sleeve shaft 5.

Consequently, the first 7 and second 10 end parts as well as the annular frame part 8 therebetween, connected with e.g. bolts through holes R1–R3 in the axial direction, constitute the driving frame of the transformer unit M. The driving frame 7, 8, 10 performs a limited alternating rotational motion during the operation of the second machine element 2 consisting of the wing torsion device. In the sawing application of the transformer unit M, the flange of the saw chain is arranged to be connected to the driving frame. The space 3 for pressurized medium is rectangular, seen in the axial cross-section of the transformer unit M, and annular, seen in the direction perpendicular to the axial direction, and is limited by the first 7 and second 10 end parts as well as by the annular frame parts 8 together with that portion of the flange part 5 which is placed at the annular frame part 8 in the radial direction. Both the stationary 6*a*, 6*b* and the mobile 9*a*, 9*b* wings correspond in their size and shape, to the rectangular cross-sectional shape of the space 3 for pressurized medium in the axial direction, wherein the side edges of the wings 6*a*, 6*b*, 9*a* and 9*b* are provided with sealings which seal the wings 6*a*, 6*b*, 9*a* and 9*b* at their side edges against the inner edges of the first 7 and second 10 end parts extending towards the space 3 for pressurized medium.

The wing torsion device which forms the second machine element 2 comprises, in the application of FIGS. 1 and 2, two wings 6*a* , 6*b*; 9*a*, 9*b*both in the sleeve shaft 5 and in the annular frame part 8, wherein the wing torsion device is divided, with respect to the space 3 for pressurized medium, into four partial volumes 3*a*–3*d* for pressurized medium (cf. FIG. 3), of which the first one 3*a* and the second one 3*b* are arranged to carry out the first stage of the second partial work performance (the volumes of the first 3*a* and second 3*b* partial volumes for pressurized medium are increased, and the volumes of the third 3*c* and fourth 3*d* ones are decreased), partially to feed the chain saw flange at the sawing stage in the sawing application, and of which the third 3*c*and fourth 3*d* ones are arranged to carry out the second stage of the second partial work performance (the volumes of the first 3*a* and second 3*b* partial volumes for pressurized medium are decreased, and the volumes of the third 3*c* and fourth 3*d* ones are increased), partially the movement of returning the flange in the sawing application.

The second end part 10 is formed to be annular in such a way that the stream of preferably hydraulic pressurized medium into the space 3 for pressurized medium in the wing torsion device, required to drive the wing torsion device forming the second machine element 2, is arranged to take place from the side of the second end part 10, through the second end of the sleeve shaft 5. Thus, the inner surface 5*b* of the sleeve shaft 5, the middle section of the sleeve shaft, is provided with a radial flange 5*c*, whose that radial front surface which faces the second end part 10 is connected to the front surface of the sleeve-like section 11*a*of the annular unit 11 for feeding pressurized medium to drive the wing torsion device, wherein the sleeve-like section of the feeding unit 11 is placed in the inner hole of the sleeve shaft, via the second end of the sleeve shaft 5. The sleeve shaft 5, the internal flange 5*c* of the sleeve shaft, and the feeding unit 11 are equipped with channelling parts which, combined in the transformer unit M, constitute a channel system 12 for feeding pressurized medium into the wing torsion device forming the second machine element 2, and for discharging it from the wing torsion device. In connection with the feeding unit 11, there is fixed a by-pass manifold for pressurized medium, provided with connections for pressurized medium to couple the channel system 12 with the hydraulic system of the forest machine. As can be seen from FIGS. 1 and 2, through an internal hole 11*c* in the sleeve-like section 11 of said feeding unit, a driving wheel 13 or the like, equipped with a mounting sleeve 13*a*, is coupled to the shaft operating as the first machine element 1 and is intended, particularly in the sawing application of the transformer unit M, to drive the saw chain rotating around the flange.

The sleeve shaft 5 is connected to the frame 4*a* of the hydraulic engine 4 at the internal radial flange 5*c* of the sleeve shaft 5 in such a way that the flange 5*c* is provided with an axial perforation R4, through which a bolted joint is made in the threaded perforation R5 on the front surface of the frame 4*a* of the hydraulic engine 4, via a perforation R4 in the flange 5*c* (FIG. 2).

Figure 3:
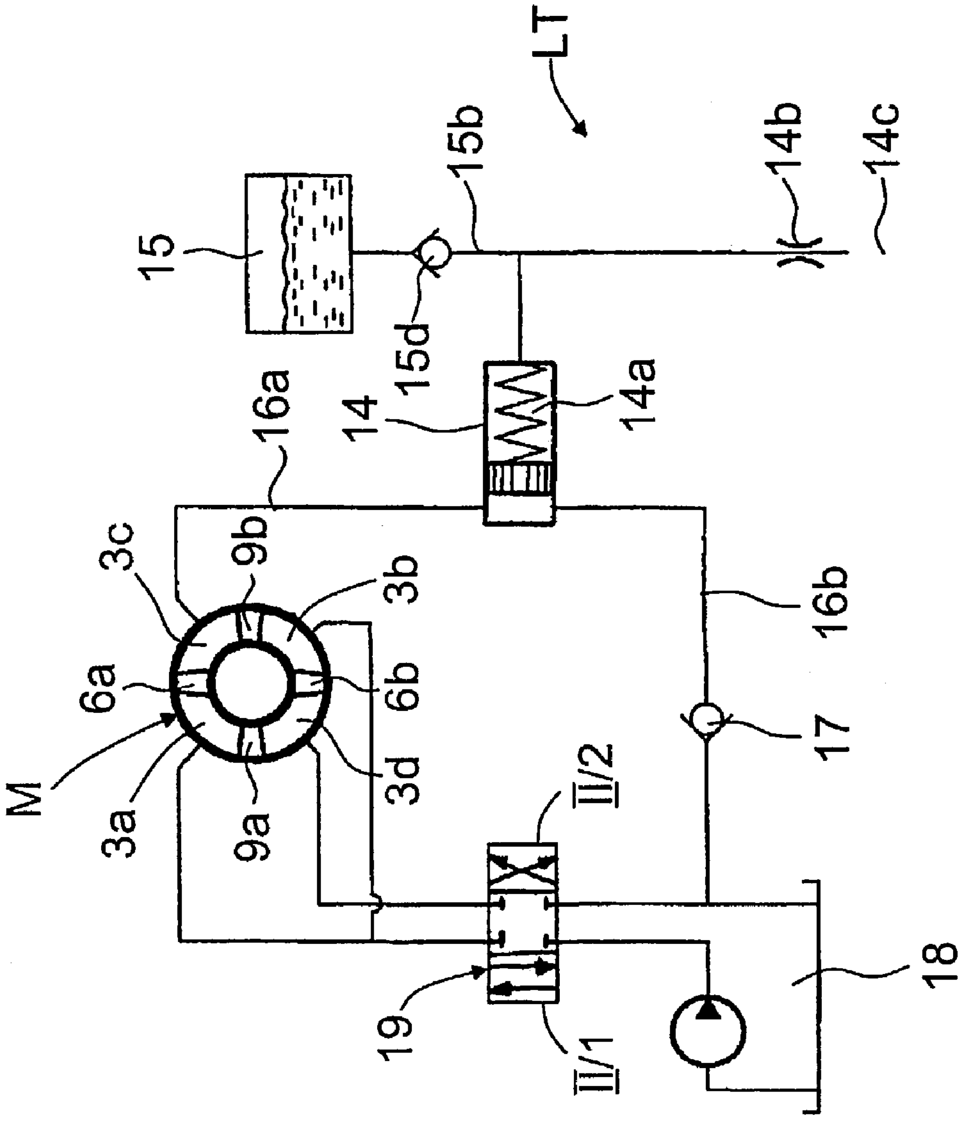
FIG. 3 shows a system for spraying an additive in a schematic view.

Particularly with reference to FIG. 3, at least one of the partial volumes for pressurized medium, e.g. volume 3*c*, is arranged to operate during the volume change in said volume 3*c* for pressurized medium, preferably as a source of energy for an auxiliary work performance LT related to the work to be performed by the transformer unit M, to be implemented by pressurized medium. Such an auxiliary work performance may, particularly in a sawing application of the transformer unit M to be used in connection with a forest machine, be lubrication of the saw chain and/or the spraying of a tree stump treatment agent. The partial volume of pressurized medium to be used in such an auxiliary work performance (e.g. 3*c*) is a partial volume of pressurized medium with a volume which is decreased during the first stage of the second partial work performance, wherein the pressurized medium discharged from the partial volume 3*c* of pressurized medium is led along a feeding line 16*a* to drive a means 14, e.g. an injection piston, transferring a medium (e.g. chain oil or tree stump treatment agent) into the target. The injection piston is spring-loaded (spring 14*a*) in such a way that it is returned to the initial position after the injection 14*c* via a throttle 14*b* during the second stage of the second partial work performance, wherein the pressurized medium returns to the partial volume 3*c* for pressurized medium in the transformer unit M, partially during the return movement of the flange in the sawing application.

The volume for spraying a medium in an injection piston is arranged to be filled from a medium storage 15 in connection with the transformer unit M along a line 15*b* equipped with a unidirectional valve 15*a* during said second stage. As shown in FIG. 3, the means 14 is coupled by means of a supplementary line 16*b* and a unidirectional valve 17, whose conducting direction is towards the means 14, to a pressurized medium tank 18, wherein it is secured that there is a sufficient quantity of pressurized medium in the partial volume 3*c* for pressurized medium. From the other partial volume 4*d* for pressurized medium, having a volume which is reduced during the first stage of the second partial work performance, the pressurized medium is led via the valve 19 to the pressurized medium tank 18. During the first stage of the second partial work performance, pressurized medium is led in the same way via the valve 19 into the partial volumes 3*a*, 3*b* for pressurized medium with increasing volumes. It is obvious that also the other partial volume 3*d*for pressurized medium, with a volume reducing during the first stage of the second partial work performance, can be used by a combination of devices 14 to 17 accomplished in a corresponding manner. The positions of the valve 19 during the first stage II/1 and the second stage II/2 of its second partial work performance are marked in the blocks of the valve 19. In the sawing application, the storage 15 of the medium to be used in the supplementary work performance is placed in connection with the harvester head HP, and an annular channel system 27 is formed between the first end part 7 and the frame 4*a* of the hydraulic engine 4 (FIG. 2), extending through the driving frame 7, 8 and 10, all the way to the means 14 in connection with the flange.

Two lugs 19, 20 are fixed to the driving frame 7, 8 and 10, onto the outer surface of its annular frame part 8. To the first one 19 is connected the frame 21 of the holder of the flange, provided with a slide bar 22 or the like for the holder 23 of the flange. To the holder 23 of the flange is connected a first end lug 24 for a clamp for the saw chain. To the second lug 20 is connected a second end lug 25 for the clamp for the saw chain. Thus, the spring set 26 intended for clamping the saw chain is placed between the first 24 and the second 25 end lugs.

The invention claimed is:

1. A transformer unit for sawing, wherein the transformer unit comprises:

a first machine element for performing a continuous rotational motion, and a second machine element for performing a limited alternating rotational motion, wherein the transformer unit can be coupled to an arrangement supplying driving energy for the transformer unit, wherein the first and the second machine elements are coupled to a chain saw with a guide bar, wherein the first machine element is for rotating the chain saw, wherein the second machine element is for feeding the guide bar and for returning the guide bar to the starting point of the sawing after the sawing, wherein the second machine element is a wing torsion device operated by pressurized medium, comprising an annular space for the pressurized medium, and wherein said annular space is placed around the first machine element.

2. The transformer unit according to claim 1, wherein the wing torsion device further comprises at least one wing placed in the annular space, radially in respect of the first machine element.

3. The transformer unit according to claim 1, wherein the inner surface of the annular space is immovable and the outer surface of the annular space rotates during the limited alternating rotational motion of the second machine element.

4. The transformer unit according to claim 1, wherein the transformer unit is connected to a frame of a hydraulic motor for driving the first machine element, wherein a sleeve shaft is placed around the first machine element and connected to the frame in a stationary manner, and wherein at least one stationary wing is connected to the outer surface of the sleeve shaft, said at least one stationary wing protruding from the outer surface radially.

5. The transformer unit according to claim 4, wherein the second machine element comprises:

a first end part, placed between the frame and said at least one wing, to limit the annular space and to surround a first end of the sleeve shaft, an annular frame part, surrounding said at least one wing and having an inner surface provided with at least one movable wing, and a second end part to limit the annular space and to surround a second end of the sleeve shaft, wherein the annular frame part is placed between the first end part and the second end part, and wherein the annular frame part, the first end part and the second end part constitute a driving frame connected to the guide bar.

6. The transformer unit according to claim 5, wherein the second end part is annular, wherein the volume flow of the pressurized medium, for driving the wing torsion device, flows through the second end of the sleeve shaft.

7. The transformer unit according to claim 5, wherein the sleeve shaft is provided with a channel system for feeding the pressurized medium into the wing torsion device and for discharging the pressurized medium from the wing torsion device.

8. The transformer unit according to claim 5, wherein the sleeve shaft is provided with two of said stationary wings and the annular franfe part is provided with two of said movable wings, wherein the annular space is divided into four partial volumes for the pressurized medium.

9. The transformer unit according to claim 8, wherein at least one of the partial volumes operates during its volume change as a source of energy for a supplementary work performance related to the sawing.

10. The transformer unit according to claim 9, wherein said at least one partial volume decreases during the feeding of the guide bar, wherein the pressurized medium fed from said at least one partial volume drives a means transferring a medium.

11. The transformer unit according to claim 10, wherein said means is a spring-loaded injection piston returning to an initial position after the injection of said medium and during the return of the guide bar, to fill an injection medium volume of the spring-loaded injection piston from a medium storage in connection with the transformer unit.

12. The transformer unit according to claim 5, wherein the driving frame is connected to a frame of a holder for the guide bar.

13. The transformer unit according to claim 1, wherein the first machine element is coupled to a driving wheel for driving the saw chain.

14. The transformer unit according to claim 1, wherein the first machine element comprises a shaft.

15. The transformer unit according to claim 1, wherein the outer surface of the annular space is immovable and the inner surface of the annular space rotates during the limited alternating rotational motion of the second machine element.

16. A transformer unit for sawing, wherein the transformer unit comprises:

a first machine element for performing a continuous rotational motion, and a second machine element for performing a limited alternating rotational motion, wherein the transformer unit can be coupled to an arrangement supplying driving energy for the transformer unit, wherein the first and the second machine elements are coupled to a chain saw with a guide bar, wherein the first machine element is for rotating the chain saw, and wherein the second machine element is for feeding the guide bar and for returning the guide bar to the starting point of the sawing after the sawing, wherein the second machine element is a wing torsion device operated by pressurized medium, comprising an annular space for the pressurized medium and at least one wing placed in said annular space, wherein said at least one wing divides said annular space into partial volumes, and wherein at least one of said partial volumes operates during its volume change as a source of energy for a supplementary work performance related to the sawing.

17. The transformer unit according to claim 16, wherein said at least one partial volume decreases during the feeding of the guide bar, wherein the pressurized medium fed from said at least one partial volume drives a means transferring a medium.

18. The transformer unit according to claim 17, wherein said means is a spring-loaded injection piston returning to an initial position after the injection of said medium and during the return of the guide bar, to fill an injection medium volume of the spring-loaded injection piston from a medium storage in connection with the transformer unit.

19. The transformer unit according to claim 16, wherein said supplementary work performance is the feeding of a lubricant for the saw chain or the feeding of a tree stump treatment agent.

20. The transformer unit according to claim 16, wherein said medium is a lubricant for the saw chain or a tree stump treatment agent.

* * * * *